(12) United States Patent
Müller et al.

(10) Patent No.: US 7,770,522 B2
(45) Date of Patent: Aug. 10, 2010

(54) SECURITY ARRANGEMENT FOR PERSON TRANSPORTING SYSTEMS SUCH AS FUN-RIDES

(75) Inventors: Alfred Müller, Grobenzell (DE); Robert Gettert, Furstenfeldbruck (DE)

(73) Assignee: Maurer Sohne GmbH & Co., KG, Munich (DE)

( * ) Notice: Subject to any disclaimer, the term of this patent is extended or adjusted under 35 U.S.C. 154(b) by 354 days.

(21) Appl. No.: 11/179,655

(22) Filed: Jul. 13, 2005

(65) Prior Publication Data
US 2006/0017271 A1 Jan. 26, 2006

(30) Foreign Application Priority Data
Jul. 20, 2004 (EP) .................................. 04017113

(51) Int. Cl.
*A63G 1/00* (2006.01)
(52) U.S. Cl. ...................................................... 104/53
(58) Field of Classification Search ................... 104/53, 104/63, 111, 115, 117; 297/484; 180/286, 180/287
See application file for complete search history.

(56) References Cited

U.S. PATENT DOCUMENTS

| 3,883,843 | A  | * | 5/1975 | Telmet et al. | ............... 180/270 |
| 6,513,441 | B1 |   | 2/2003 | Clerx |  |
| 6,869,100 | B2 | * | 3/2005 | Breed et al. | ................. 280/735 |
| 2004/0032157 | A1 | * | 2/2004 | Trimborn | .................... 297/484 |

FOREIGN PATENT DOCUMENTS

DE        102 60 386 A        7/2004

* cited by examiner

*Primary Examiner*—S. Joseph Morano
*Assistant Examiner*—Robert J McCarry, Jr.
(74) *Attorney, Agent, or Firm*—Birch, Stewart, Kolasch & Birch, LLP

(57) ABSTRACT

A security arrangement for passengers in transport systems and fun-rides, more particularly amusement devices such as roller coasters or the like, comprising a holding means (3), with the aid of which the passenger to be secured is prevented from leaving a secured ride position, more particularly a seat (2), the holding means being able to assume at least one open and a plurality of securing positions, the different securing positions of the holding means being associated with at least two secured position ranges, which are detected by a signal producing means (7, 9 and 10) associated with the holding means (3).

19 Claims, 3 Drawing Sheets

SECURITY ARRANGEMENT FOR PERSON TRANSPORTING SYSTEMS SUCH AS FUN-RIDES

Figure 1:
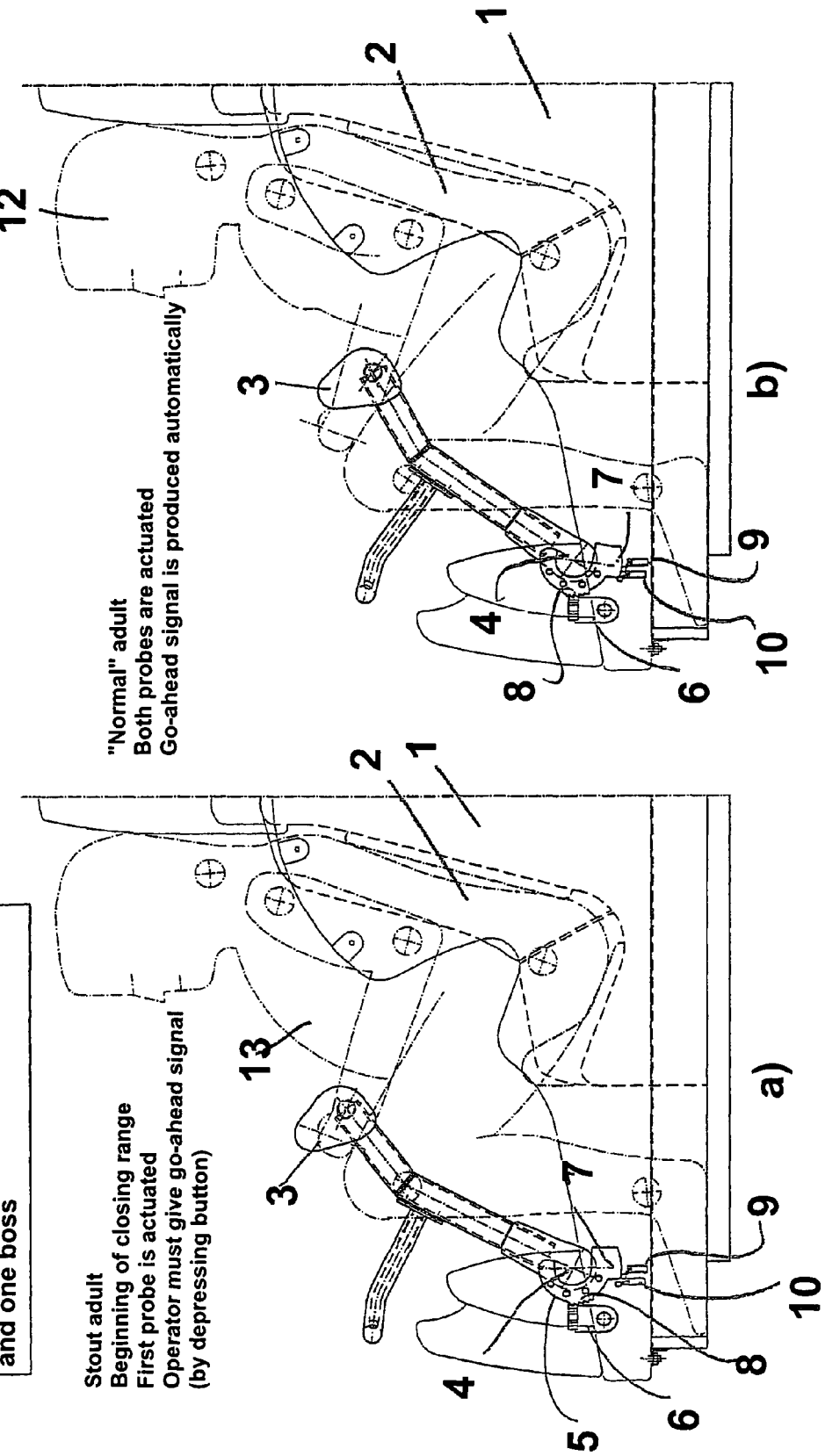

The invention relates to a security arrangement for persons and for fun-rides according to the preamble of claim 1.

In fun-rides such as roller coasters or the like but also in the case of other transport systems such as for example funicular systems, security and holding means are provided, which are to prevent persons using the transporting systems and fun-rides slipping off their secured ride position range such as a seat. For this purpose a wide range of different systems is known, such as for instance lap retainer members, shoulder and head retainer members and the like. These securing and holding means share the common feature that on the one hand they must provide the most complete security possible and on the other hand must be suitable for quite different users. These two aspects lead to divergent requirements as regards the securing and holding means, since for example in the case of lap retainer members for roller coasters the desired security is only ensured, if the lap retainer member is in sufficiently close engagement with the body of the person to be secured in order to avoid slipping through any clearance left between the securing and holding means on the one hand and on the other hand the seat.

On the other hand owing to great anatomical differences among passengers there is a need for securing and holding means to be adjustable so that both stout persons and also slim persons and furthermore tall and short persons are able to use the transport system or, respectively, fun-ride while being held sufficiently securely.

These problems are normally solved in such a manner that the holding means, for example the lap retainer members, are able to assume a plurality of securing positions so that the distance of for example the lap retainer member from the seat or, respectively, seat surface or back rest may be adjusted. This however leads to the problem that in some circumstances there is an insufficient securing action for the person on the seat, if such person should be a small, slim child, in the case of which the securing or lap retainer member is only in a securing position, which is suitable or adequate for a tall, stout person. There is then the danger of the child's falling off the seat or being thrown from it during a ride owing to the larger distance of the holding means from the seat or surface thereof and back rest.

Accordingly one object of the present invention is to provide a security arrangement which despite variable setting of the securing positions of the holding means is able to ensure that persons of different heights and different body sizes are provided with adequate safety, such security arrangement being simply structured and readily operated. More particularly, the security arrangement is to provide an effective timing of operations.

This object is to be achieved by a security arrangement with the features of claim 1. Advantageous further developments are specified in the claims.

The security arrangement of the invention, which in combination with manual or automatic monitoring systems may be employed to detect whether the desired securing of the person to be secured has actually taken place or not, serves more especially the purpose of automatically and rapidly determining whether person, who is already secured, has been provided with a sufficient degree of security. For this purpose using at least one signal producing means monitoring is performed to ascertain in which securing positions the holding means is located. For this at least two and preferably however three or more secured position ranges are defined with the aid of which lack of security coverage is rapidly is precisely detected, and in a case in which such any lack of coverage is found an optical and/or acoustic warning signal and furthermore an automatic brake for the transport system or the fun-ride may be put into operation in order to halt the fun-ride or to prevent it starting. After checking the secured state the operator of the fun-ride may give go-ahead signal to permit operation thereof and/or take appropriate steps.

The security arrangement in accordance with the invention preferably has at least two secured position ranges, the first secured position range comprising securing positions of the holding means, in the case of which tall and/or stout persons are amply secured in their ride positions, whereas short and/or slim persons such as children are not sufficiently secured. The first secured position range accordingly is characterized by the holding means being at a relatively large distance from the seat, standing or lean-on surfaces of the ride position for the person to be secured. In this secured position range it is accordingly necessary to check whether in fact such a person with the anatomical features envisaged is occupying the position to be secured. Accordingly, when the signal producing means detects that the holding means is located in the first secured position range, a corresponding optical and/or acoustic warning signal and/or a signal for influencing the course of operations is produced, i.e. more particularly a stop signal, such signal preferably also being able to be processed by a corresponding control means.

The second secured position range is here so defined that even short or slim persons such as children, are sufficiently secured so that when the signal producing means finds that the holding means is located in the second secured position range no corresponding warning and/or stop signal must be produced.

Preferably in the case of a preferred embodiment a third secured position range is defined in the case of which the holding means is located at such a small distance from the stand-on, sit-on or lean-on surfaces of the ride position as to make it clear that in this case it is a question of particularly short and/or slim persons, and more particularly a very small child in need of an accompanying adult or who is generally unsuitable for being conveyed by the transport system or the fun-ride owing to anatomical features. In this case as well the signal producing means will produce a corresponding warning and/or stop signal so that the operator may instruct the respective person to get off the fun-ride.

As already stated the security arrangement in accordance with the invention may be employed in combination with automatic means or individual inspection for monitoring to detect whether a person on the fun-ride is secured at all.

In the case of automatic monitoring before starting or beginning of the ride steps are taken so see whether all persons already on the transport system or the fun-ride are secured or not. This may be ensured for example by using a sensor means to see whether all individual ride positions, such as for example seats, of the fun-ride are occupied by a person. On the basis of such information it is possible to see whether the associated securing or, respectively, holding means is in the open or closed, i.e. secured position range. This can be performed according to an advantageous development of the invention using the same signal producing means, which then also detects, in which secured position range the holding means is located. As an alternative it is however possible for different or separate signal producing means to be provided.

Furthermore other systems are possible to detect whether the one or more holding means are in a permissible operational state, that is to say if there is a secured state when a person is in the ride position. For instance the holding means could be automatically moved into a secured position range by respective drives, irrespectively of whether a person to be secured is in the respective ride position or seat. In this case it not is necessary, as is also the case with purely individual non-automatic inspection, in the case of which the operator himself to convince himself that at all positions, which are occupied by persons or fun riders, the holding means has been actuated, for any additional signal producing means to be provided or, respectively, for an additional signal to be produced. In fact the security arrangement in accordance with the invention is then only employed to ensure that for the secured ride positions the respective secured condition is detected dependent on the secured position range. Preferably however a combination with an automatic system is preferred, in which the secured state is automatically produced or detected for all ride positions so that the operator only has to convince himself that proper use is being made of the system.

Preferably the signal of the signal producing means or, respectively, of signals produced by the number of ride positions on a fun-ride or transport system, are processed by a control means, which for example may be in the form of a programmable microprocessor.

A particularly simple possibility for the design of a security arrangement in accordance with the invention or, respectively, the signal producing means necessary for it, is such that in the case of the holding means, which are normally able to be moved by rotary or rocker switches and/or slide mechanisms in relation to the ride position, means are provided for indicating the angular, rocking and/or sliding position, such means being for example in the form of mechanical components as for example bosses and rocker switches cooperating with same. It is naturally possible for the signal producing means to comprise any other suitable means for ascertaining the position of the holding means such as electronic sensors or the like.

Once the security arrangement in accordance, with the invention has detected an insufficient securing action in a certain ride position, the operator can purposively and effectively convince himself of the security situation at the ride position from which the warning comes and take any measures necessary. In order afterwards to start or continue the ride, an input device is preferably provided, by means of which the operator, after checking the security situation can override the start arrest state and can give a go-ahead signal.

Further advantageous developments and convenient forms of the invention will be understood from the following detailed descriptive disclosure of three embodiments thereof in conjunction with the diagrammatic accompanying drawings.

FIGS. 1a and b show a side view of a security arrangement in accordance with the invention as applied to a seat of a roller coaster vehicle.

FIGS. 2a through c are side views of a second working example of a security arrangement in accordance with the invention similar to the example of FIG. 1.

FIGS. 3a through c are side elevations of a third working example.

In FIG. 1 the two figure parts a and b show two side views of a first working example of a security arrangement in accordance with the invention for a seat 2 of the roller coaster vehicle 1, which is only partly illustrated.

The seat 2 is provided with a holding means in the form of a lap retainer member 3, which is able to be pivoted by means of a rotating device 4 about an axis of rotation perpendicular to the plane of the drawing toward the seat 2.

On the rotating device 4 a crescent-like rotary element 5 is provided, which turns together with the lap retainer member 3 about the above mentioned axis. On the rotary element 5 detent means in the form of projecting teeth are provided which cooperate with an arresting means 6 so that the lap retainer member 3 may be arrested in different positions corresponding to the teeth 8. Here in the case of the lap retainer member 3 there is a possibility of movement between an unsecured setting, in which the teeth 8 do not engage the arresting device 6 and in which the lap retainer member is directed substantially upward, and several secured settings or positions, in which the lap retainer member 3 is secured in position by means of the rotary element 5 and the teeth 8 in position. The teeth 8 in this case engage the arresting means also in corresponding detent means, for instance, detent recesses being possibly provided, which are biased by means of spring element toward the rotary element 5 or, respectively, the teeth. If the detent means or, respectively, teeth 8 and the detent recesses of the arresting element 6 are suitably matched to each other, the lap retainer member 3 may only be shifted in one direction, namely toward the seat 2 through the various detent positions, whereas for an opposite movement release of the arresting mechanism 6, for example by motor driven drawing back of the detent recess means has to be provided. This may for example occur by way of a control means (not illustrated) automatically after the end of the ride.

Normally there is also a provision such that a monitoring means or, respectively, a signal producing means is so arranged that a check is automatically made as to whether the lap retainer member 3 is secured by the teeth 8 and the arresting device 6 that is to say when prior to a ride a further detecting or sensor means detects whether a person or passenger is on the seat 2 or ride location or not. It would also be possible for the lap retainer member 3 to be automatically shifted by a suitable drive, irrespectively of whether a passenger is sitting on the seat 2 or not, is automatically always shifted into the first secured position range so that it is possible to do without an additional detecting means which would ascertain whether the seat is occupied or not. Furthermore it would be feasible to detect by individual inspection whether the operational state of the lap retainer member. i.e. of the holding means, is in a permissible or prescribed state. that is to say whether a passenger has taken a seat at the corresponding position and therefore the lap retainer member must be closed before the start of a ride or whether there is no passenger on the seat so that the lap retainer member may remain open, such inspection being performed by the operator of the system taking a look to see whether the holding means, that is to say the lap retainer member 3, are in a closed condition in the case of all passengers qd In this case the automatic security arrangement, described in the following, would merely be employed to automatically detect whether, in the case of a closed lap retainer member, the necessary securing position is achieved or not. Preferably there is however a combination with automatic detection of whether the lap retainer member or, respectively, the holding means, is in a prescribed operational state at all, that is to say whether the holding means is closed in the case of a position being occupied by a passenger or not, or the automatic placement in a secured state.

Figure 2:
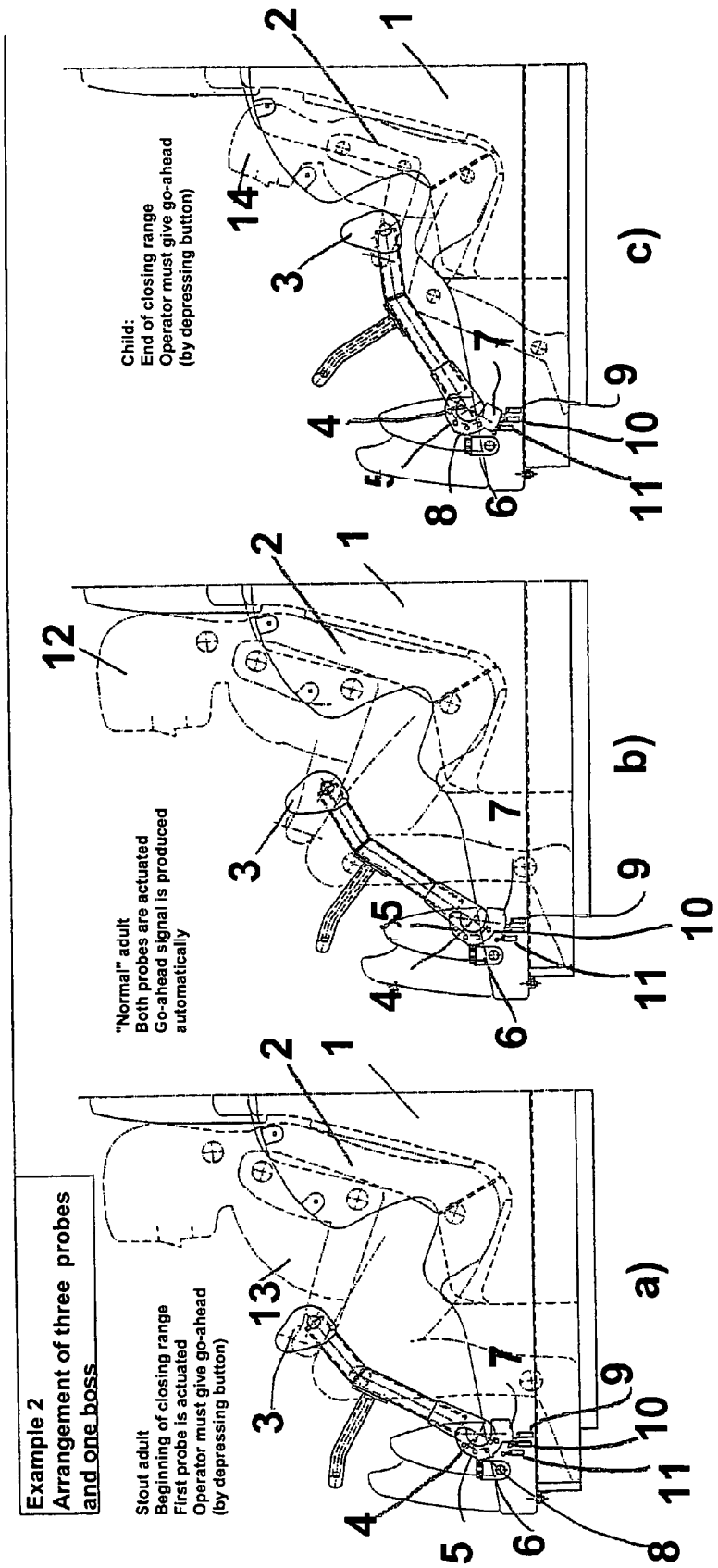
Figure 3:
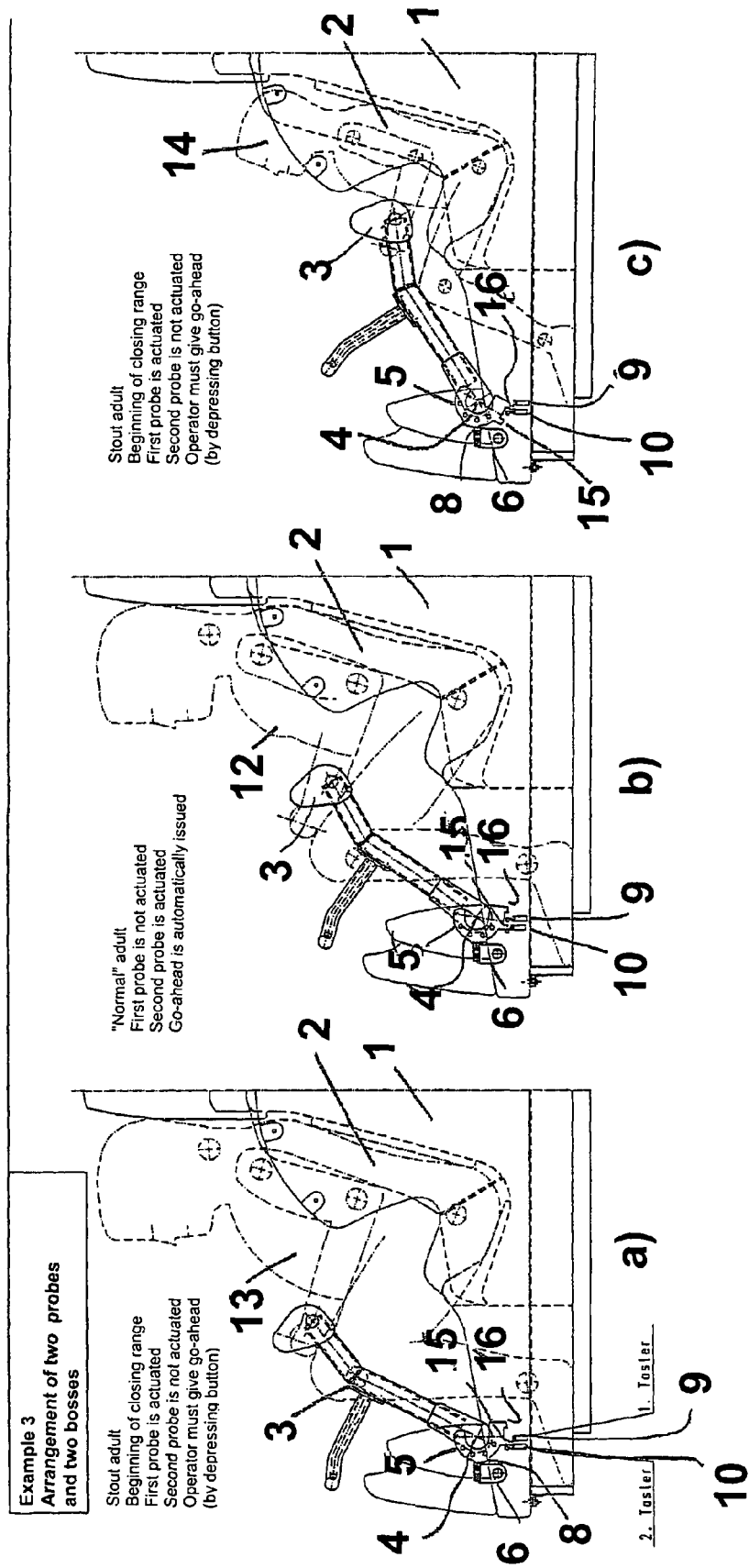

In the case of the working examples depicted in FIGS. 1 through 3 of the security arrangement in accordance with the invention the rotating device 4 of the lap retainer member 3 with the rotary element 5 has an element, which turns with the pivoting of the lap retainer member 3. It is in this manner that furthermore the boss 7 arranged at one end of the semicircular rotary element 5 in the working example of FIG. 1 is also pivoted. By such pivoting the boss 7 actuates rocker switches 9 and 10, arranged along its pivoting path adjacent to each other so that in accordance with position of rocking of the lap retainer member 3 different switching states of the rocker switches 9 and 10 are produced in the different secured position ranges.

As shown in FIG. 1a on pivoting of the lap retainer member 3 through small angular range from the open position into a first secured position range, in which there is still a large distance between the lap retainer member 3 and the seat 2 to accept a stoutish passenger, only the first rocker switch 9 is operated, whereas the second rocker switch 10 is not yet actuated by the boss 7.

It is only when the lap retainer member 3, as illustrated in FIG. 1b is shifted by further pivoting toward the seat 2 arrives in the second secured position range, that the second rocker switch 10 is also operated by the boss 7.

Since in the securing position according to FIG. 1a there is no sufficient security for short and thin passengers as regards falling off the seat 2, that is to say there is no sufficient security for children, in the securing position of the lap retainer member 3 in FIG. 1a the operator receives a signal by way of a control means, not illustrated, or by way of corresponding actuation by the switching state of the switch combinations with the rocker switches 9 and 10 and starting of the transport system or fun-ride is inhibited. It is only when the operator has convinced himself that the securing position or state of the lap retainer member 3 is sufficient for the passenger on the seat 2, that by a suitable input, as for example by operation of an actuating knob, the inhibition of starting may be overridden and a go-ahead given for the transport system or fun-ride. The warning signal provided for the operator, which may be acoustic or optical, preferably exactly indicates for a plurality of ride positions the ride position or positions, for example by means of an associated warning light, at which the security state must be checked.

The security arrangement in accordance with the invention enables the operator to be purposively made aware of problematical closing positions of the holding means and he can then convince himself in an effective fashion of the proper closing of the holding means.

A further working embodiment of the security arrangement of the invention is illustrated in the parts a through c of FIG. 2. Here as well a holding means in the form of a lap retainer member 3 is utilized, which is able to be pivoted by way of a turning device 4 toward the seat and by way of an arresting device 6 can be locked in different securing positions. It is however naturally possible to provide other holding means, as for example shoulder retainer members or the like, which may be shifted by other setting mechanisms between an open position and secured position ranges.

In the case of the holding means of the embodiment in accordance with FIG. 2 there is also a semi-circular or crescent-like rotary element 5, which at its bottom end bears an outwardly projecting boss 7, which again is able to operate rocker switches 9 through 11. Unlike the preceding embodiment in accordance with FIG. 1 however in this case there are three instead of two rocker switches 9 through 11. It is in this manner that three secured position ranges may be defined, the first secured position range being specified, when the first rocker switch 9 is operated, the second secured position range being reached by actuation of the two rocker switches 9 and 10 and the third secured position range being indicated by the actuation of all three rocker switches 9 through 11. The rocker switches 9 through 11 are so arranged along the pivoting boss 7 that in one position in the first secured position range the lap retainer member 3 is so arranged that stout adults are secured in the seat 2, whereas in the second secured position range, when the lap retainer member 3 or, respectively, the corresponding turning element 5 actuates the two rocker switches 9 and 10 with the boss 7, a normal adult is secured, this also being sufficient for securing a child, who is permitted to use the fun-ride.

Additionally however in the case of the working example in accordance with FIG. 2 a third secured position range is defined, in which the lap retainer member is placed particularly near the seat 2 so that all three rocker switches 9 through 11 are actuated. In this case the signal producing means indicates with the boss 7 and the rocker switches 9 through 11 that a particularly slim or short passenger and more especially a child, who does not yet have permission to use the fun-ride or need to be accompanied by an adult or requires other special measures to be taken, is on the seat 2. Accordingly with the security arrangement of the invention it is possible to detect whether particularly small children, who lack permission to use the particular fun-ride, are on a seat. In this case as well owing to the switching state with the switches 9 through 11 the signal producing means yields a signal, which either triggers a warning for the operator of the transport system or the fun-ride and furthermore a no-start state or by way of a control means, not illustrated, causes a corresponding effect on the course of operations of the transport system or of the fun-ride.

In its parts a through c FIG. 3 shows a further embodiment of the security arrangement in accordance with the invention in side views corresponding to FIGS. 1 and 2, in the case of which for producing corresponding switching states for three secured position ranges two boss 15 and 16 are provided on the rotary element 5, such bosses cooperating with two rocker switches 9 and 10. The first secured position range is indicated when the first boss 15 is engagement with the first rocker switch 9 and the rocker switch 9 is actuated. The second secured position range is reached when the second rocker switch 10 is operated by the first boss 15 and the first rocker switch 9 is released again, that is to say is located in the free space between the two bosses 15 and 16.

The third secured position range is indicated when the first rocker switch 9 is actuated by the second boss 16, whereas the second rocker switch 10 is released. In this case additionally a memory means, not illustrated, is provided, which registers the preceding actuation of the two rocker switches 9 and 10 and accordingly associates the switch position—first rocker switch 9 actuated 9 and second rocker switch 10 not actuated—with the third secured position range. Naturally it is possible to dispense with the respective memory means, when for instance the second boss 16 is so designed that it actuates both rocker switches 9 and 10 in the third secured position range.

In addition to a system with individual or discrete secured position ranges or switch positions, as described above, the design also extends to continuous or incremental systems with a corresponding detection and processing of signals.

The invention claimed is:

1. A security arrangement for a passenger in a transport system or a fun-ride, comprising:
   holding means adapted to secure the passenger in a secured ride position and to prevent the passenger from leaving the secured ride position,
   the holding means being movable among at least one open position and a plurality of different securing positions,
   the different securing positions of the holding means being associated with at least a first secured position range and a second secured position range, the second secured position range being separate from the first secured position range, the first secured position range being detected by at least a first signal producing means associated with the holding means, wherein when the holding means is detected to be in the first secured position range, the first signal producing means is adapted to produce a first signal to inhibit operation of the transport system or the fun-ride, and wherein when the holding means is detected to be in the second secured position range, the second signal producing means is adapted not to produce the first signal to inhibit operation of the transport system or the fun-ride.

2. The security arrangement as set forth in claim 1, wherein a third secured position range is provided, which comprises securing positions of the holding means, which indicate that the passenger, who has a height or a breadth below a predetermined amount for the transport system or the fun-ride, or who requires particular attention or particular measures, is located behind the holding means wherein the first signal is produced when the holding means is located in the third secured position range.

3. The security arrangement as set forth in claim 2, wherein a first distance between a stand-on, sit-on and/or lean-on surface of the ride position and the holding means or components thereof is provided in the first secured position range of the holding means, a second distance between a stand-on, sit-on, and/or lean-on surface of the ride position and the holding means or components thereof is provided in the second secured position range of the holding means, the first distance being larger than the second distance, and a third distance between a stand-on, sit-on, and/or lean-on surface of the ride position and the holding means or components thereof is provided in the third secured position range of the holding means, the third distance being smaller than the first and second distances.

4. The security arrangement as set forth in claim 2, further comprising a second signal producing means associated with the holding means, the second signal producing means being capable of producing a second signal independently of the first signal producing means.

5. The security arrangement as set forth in claim 4, further comprising control means adapted to receive the first signal of the first signal producing means, and/or the second signal of the second signal producing means to produce an output signal to control a course of operations of the transport system or of the fun-ride, to halt the transport system or the fun-ride, and/or to produce a warning and indicating signal indicating that the holding means could be in an insecure ride position.

6. The security arrangement as set forth in claim 4, wherein the second signal warns an operator optically and/or acoustically using suitable means.

7. The security arrangement as set forth in claim 2, wherein the holding means comprises rotary, pivoting, or sliding means by which the holding means, or components thereof, are able to be shifted in relation to a stand-on, sit-on, and/or lean-on surface of the ride position, the rotary, pivoting, or sliding means comprising parts of the at least the first signal producing means, which indicate the rotary, pivoting, or sliding position in steps or continuously, and in accordance with the secured position ranges.

8. The security arrangement as set forth in claim 7, wherein the parts for indicating the rotary, pivoting, or sliding position comprise at least a first boss or inductive proximity switch, which dependent on the rotary, pivoting, or sliding position, comes into engagement with first, second, and third associated circuit means.

9. The security arrangement as set forth in claim 8, wherein the first boss and the first and second associated circuit means are provided for mutual cooperation in order to create two circuit conditions corresponding to the first and second secured position ranges.

10. The security arrangement as set forth in claim 9, wherein the first and second associated circuit means are probes.

11. The security arrangement as set forth in claim 8, further comprising second and third bosses, wherein the second and third bosses and the first and second associated circuit means, or the first boss and the first, second, and third associated circuit means are provided for mutual cooperation in order to create at least three circuit conditions corresponding to the first, second, and third secured position ranges.

12. The security arrangement as set forth in claim 11, wherein the holding means comprises a rotary device, the rotary device comprising a crescent-shaped rotary element, which on rotary movement of the rotary device is turned about an axis so that the first, second, and third bosses projecting from the rotary element come into contact with the first, second, and third associated circuit means.

13. The security arrangement as set forth in claim 12, wherein the first, second, and third associated circuit means are rocker switches.

14. The security arrangement as set forth in claim 8, the first signal producing means being adapted to produce a first signal when the holding means is detected to be in the first secured position range, the first signal being adapted to inhibit operation of the transport system or the fun-ride.

15. The security arrangement as set forth in claim 1, further comprising an input device by means of which the transport system or the fun-ride may be freed for further travel.

16. The security arrangement as set forth in claim 1, wherein the transport system or the fun-ride include amusement devices.

17. The security arrangement as set forth in claim 1, wherein the transport system or the fun-ride include roller coasters.

18. The security arrangement as set forth in claim 1, wherein the secured ride position is a seat.

19. The security arrangement as set forth in claim 1, wherein when the holding means is in the first secured position range, the passenger may or may not be sufficiently secured, and when the holding means is in the second secured position range, the passenger is sufficiently secured.

* * * * *